INVENTOR
JOSEPH ZEMANEK, JR.

March 25, 1969   J. ZEMANEK, JR   3,435,224
DOWNHOLE SYSTEM FOR STORING AND READING OUT DETECTOR
SIGNALS FOR TRANSMISSION TO THE SURFACE
AT RELATIVELY LOW FREQUENCY
Filed June 23, 1965   Sheet 2 of 3
FIG III
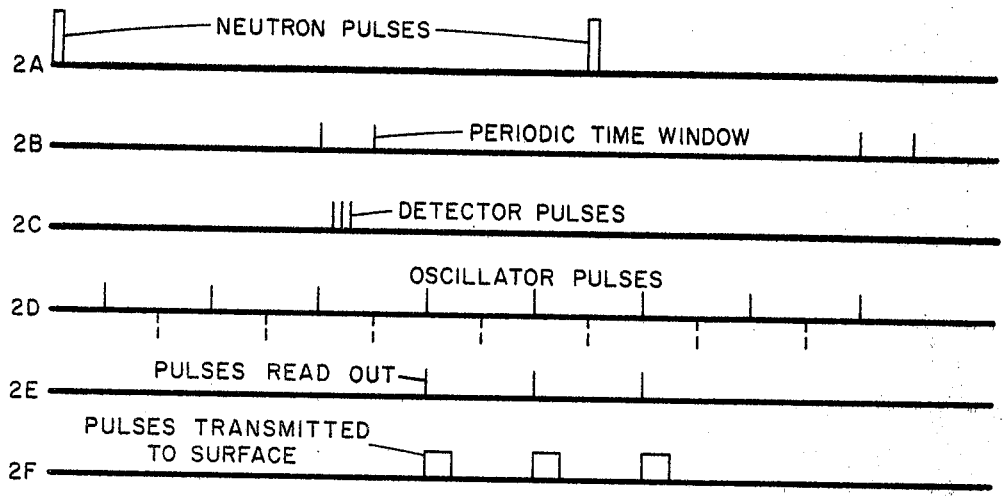
FIG IV
| DETECTOR PULSES | OSCILLATOR PULSES | BM 60 | | BM 61 | |
|---|---|---|---|---|---|
| START | | + | O | + | O |
| 1 | | O | + | O | + |
| 2 | | + | O | O | + |
| 3 | | O | + | + | O |
| | 1 | + | O | O | + |
| | 2 | O | + | O | + |
| | 3 | + | O | + | O |
INVENTOR
JOSEPH ZEMANEK, JR.
BY  *Arthur F Zobal*
ATTORNEY

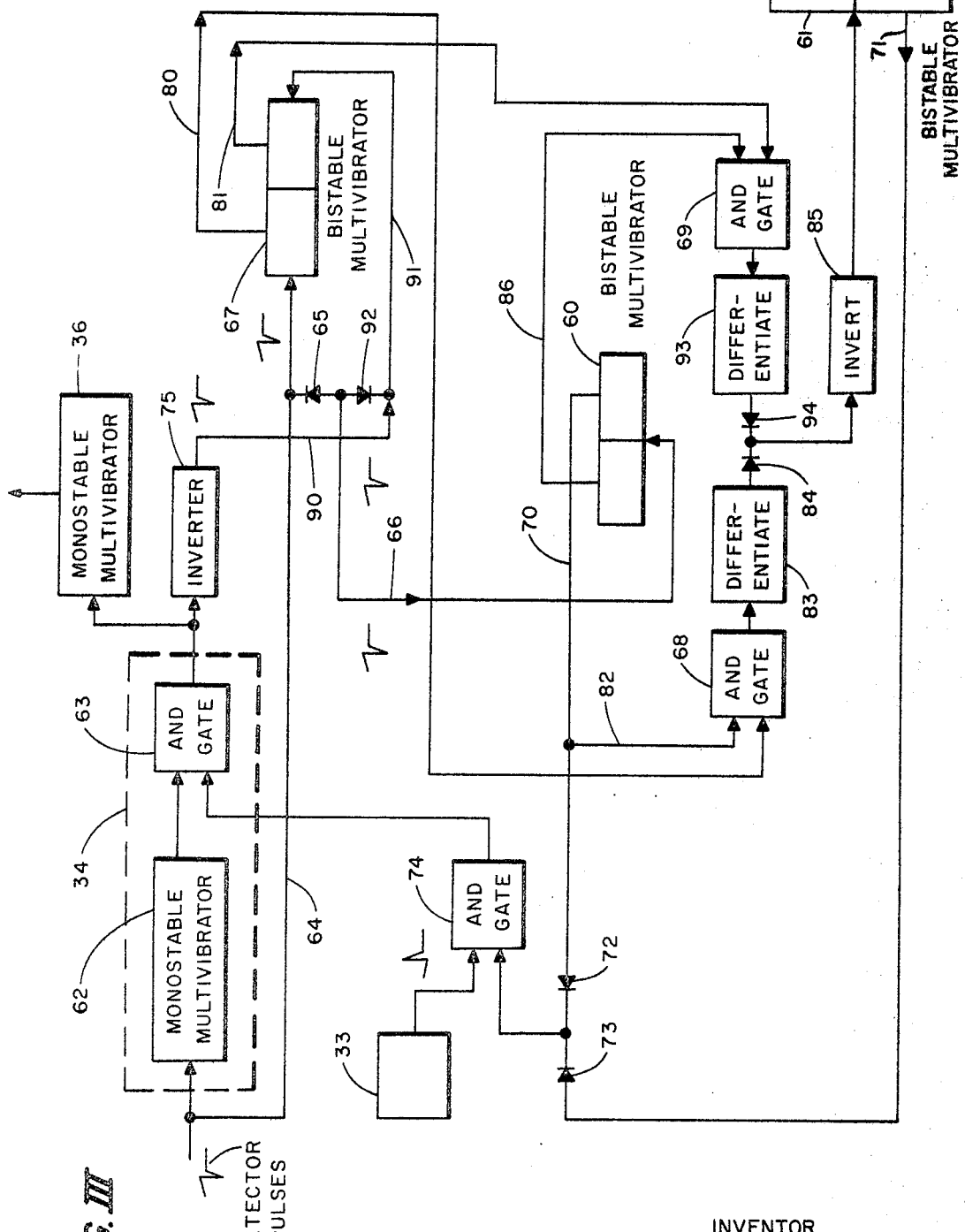

United States Patent Office 3,435,224
Patented Mar. 25, 1969

3,435,224
DOWNHOLE SYSTEM FOR STORING AND READING OUT DETECTOR SIGNALS FOR TRANSMISSION TO THE SURFACE AT RELATIVELY LOW FREQUENCY
Joseph Zemanek, Jr., Dallas, Tex., assignor to Mobil Oil Corporation, a corporation of New York
Filed June 23, 1965, Ser. No. 466,181
Int. Cl. G01t 1/18
U.S. Cl. 250—83.6     16 Claims

ABSTRACT OF THE DISCLOSURE

The specification discloses a well logging signal storage and read out system in a pulsed neutron logging tool having a pulsed neutron source and a radiation detector. The storage system comprises two storage circuits for storing detector pulses produced by the detector upon detection of radiation during two time periods within each cycle of operation. Means is coupled to each storage circuit for generating timing pulses at a relatively low frequency for reading out, at the low frequency, pulses stored in each storage circuit for application to a transmission line for transmission to the surface.

---

This invention relates to the transmission of well logging signals and, more particularly, to a system which is capable of storing closely spaced and randomly distributed pulses for application to a cable conductor at a predetermined fixed and relatively low frequency whereby the pulses transmitted to the surface may be easily resolved.

In the field of well logging, intelligence signals, such as electrical pulses, are generated by means employed in a borehole tool and generally are transmitted to the surface by way of a cable conductor. The pulses generated and transmitted over the conductor may represent conditions sensed or phenomenon detected and hence give information about the formation characteristics. For economic reasons, it is desirable to employ, for transmission purposes, the same conventional multiconductor cables which are readily available in the field and generally are employed in various well logging techniques.

In applications such as radioactive well logging, however, the pulses produced generally represent radiation detected and hence are randomly spaced and further may occur at very close time intervals, for example, of the order of 10 microseconds. Such closely spaced pulses cannot be resolved at the surface when applied to the conventional cable conductor for transmission. This is due to the relatively poor frequency response of these conductors. Thus, only one pulse, instead of two, may be counted and measured at the surface.

In order to increase the statistical accuracy, however, it is desirable to count all of the detector pulses produced during a measurement interval of interest. This is particularly true in pulsed neutron well logging wherein detector pulses generally are counted only during two narrow time windows. In such operations only a few detector pulses may be produced during the time windows of interest. Hence, counting loss which may occur during transmission may seriously affect the statistical accuracy of the measurements obtained.

In accordance with the present invention, there is provided a novel system for transmitting intelligence signals over a transmission line employed in a well logging system and which avoids loss of counts during transmission. The system includes a borehole tool having means located therein for producing pulses representative of formation characteristics. Counting means located in the tool is employed for counting the pulses. In addition, means located in the tool generates timing functions at a predetermined frequency for reading out, at the predetermined frequency, pulses stored in the counter for application to the transmission line for transmission from the borehole to the surface. Recording means located at the surface obtains a measurement representative of the pulses applied to the transmission line.

In the embodiment disclosed, the transmitting system is employed in a pulsed neutron well logging system employing a pulsed neutron source and a secondary radiation detector. In the logging operations, the neutron source is pulsed for the production of bursts of fast neutrons spaced in time. A detector located in the tool produces pulses representative of secondary radiation detected while the counting means located in the tool counts the pulses produced. Means coupled to the counter generates timing functions at a predetermined relatively low frequency for reading out at the low frequency pulses stored in the counter for application to the transmission line. With this arrangement, counts may be stored in the counter during detection periods and read out at quiescent intervals when secondary radiation is not being detected.

For further objects and advantages of the present invention and for a more complete understanding thereof, reference may be made now to the following detailed description taken in conjunction with the accompanying drawings, wherein:

FIGURES 2A–2F illustrate timing diagrams useful in understanding the present invention;

FIGURE 3 is a block diagram of a count storage means employed in the system of FIGURE 1; and FIGURE 4 is a table useful in understanding the operation of the system of FIGURE 3.

Figure 1:
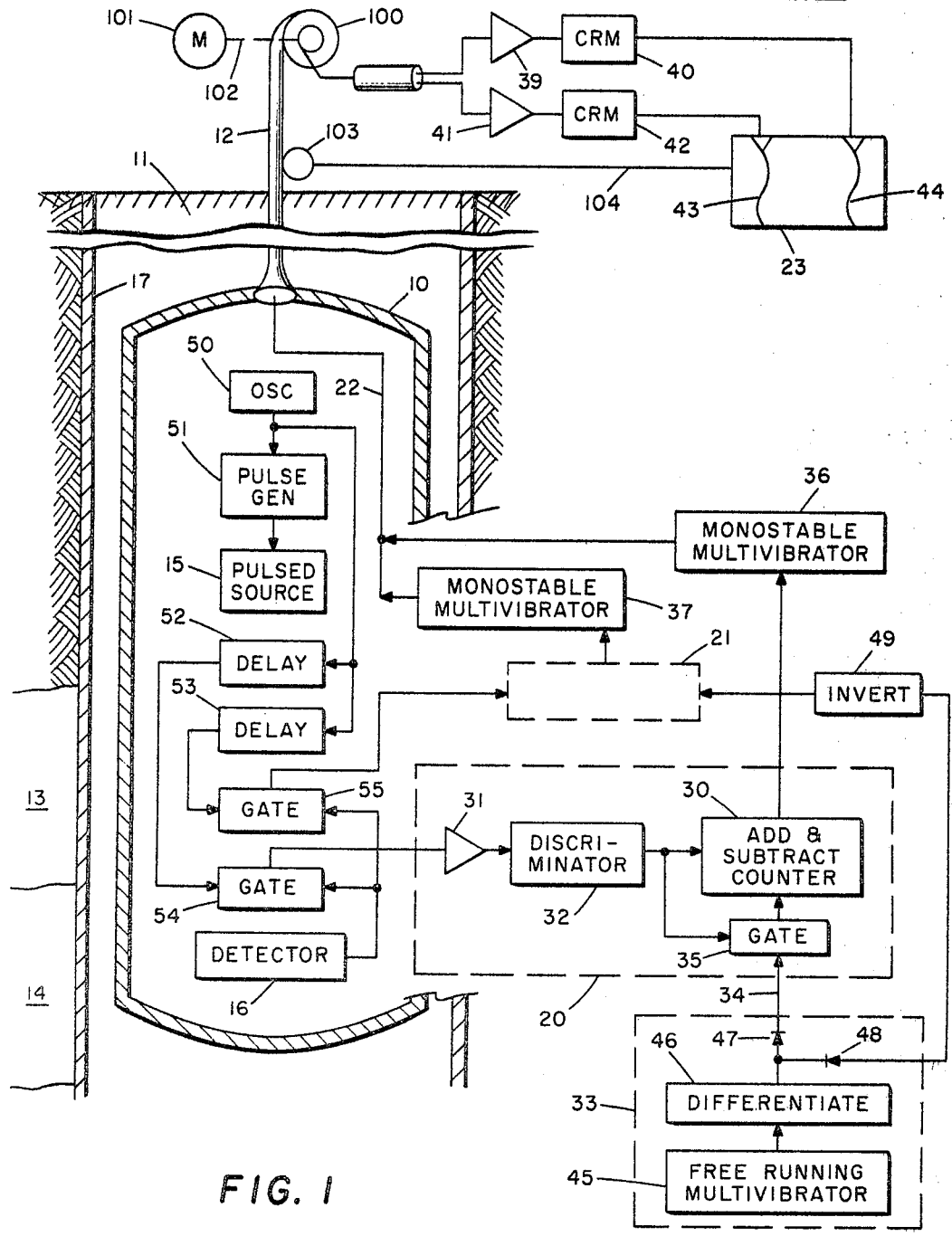
FIGURE 1 illustrates a borehole system employing the present invention.

Referring now to FIGURE 1, there will be described a well logging system employing the transmission system of the present invention. As illustrated, the well logging system comprises a borehole tool 10 which is moved through a borehole 11, by cable 12, in order to investigate formations of interest, for example, those illustrated at 13 and 14. In the embodiment to be described, the borehole tool 10 includes a pulsed neutron source 15 and a secondary radiation detector 16 for obtaining information through iron casing 17. During logging operations, the source 15 periodically is pulsed for the production of bursts of fast neutrons spaced in time and illustrated in FIGURE 2A. The neutrons produced irradiate the formations and the resulting secondary radiation is detected by detector 16. In the preferred embodiment, detector 16 is a thermal neutron detector for detecting thermal neutrons. Between neutron bursts, the detector 16, including associated instrumentation, is controlled to detect thermal neutrons within two spaced time windows. One periodic time window is illustrated in FIGURE 2B and will be referred to as the first time window. The detector output produced during the first time window is applied to a storage unit 20, while the detector output produced during the second time window is applied to storage unit 21. Within storage units 20 and 21, the detector pulses are temporarily stored and then read out at a fixed relatively low frequency. Upon read out, the pulses are increased in width and applied to cable conductor 22 for transmission to the surface of a recorder 23. With the arrangement of the present system, the pulses may be read out at a low frequency when radiation is not being detected, thereby avoiding loss in counts upon transmission which may otherwise occur if closely spaced pulses were applied to the conductor 22.

Referring to the storage system 20, this system comprises an add and subtract counter 30 to which detector pulses, produced during the first time window, are applied for storage. Application of the detector pulses, illustrated in FIGURE 2C, is by way of amplifier 31 and threshold discriminator 32. A relatively low frequency oscillator system 33 also is coupled to the counter 30, by way of conductor 34 and gate 35. The oscillator 33 produces sharp read out pulses for reading out the detector pulses stored in counter 30. Read out is at the same frequency as the frequency of the pulses produced by oscillator 33. The pulses applied to the counter 30 from oscillator 33 are illustrated by the solid lines in FIGURE 2D while the stored pulses read out are illustrated in FIGURE 2E. The latter pulses are applied to monostable multivibrator 36 for the production of positive pulses of increased width, as illustrated in FIGURE 2F, for transmission to the surface by way of conductor 22.

In the storage system 20, read out is prevented when detector pulses are being produced. In this connection, gate 35 is employed to block the output of oscillator 33 to the counter 30 when a detector pulse is being applied thereto.

Storage unit 21 is similar to storage unit 20 except, as mentioned above, it is employed to store detector pulses produced within the second time window. Read out pulses also are applied to storage system 21 from oscillator 33. These pulses, however, are spaced in time from those applied to system 20 to prevent coincident read out. The output of storage system 21 is applied to monostable multivibrator 37 for the production of pulses of increased width, equal to those produced by monostable multivibrator 36, but of negative polarity. These pulses are applied to cable conductor for transmission to the surface. At the surface, the positive pulses for multivibrator 36 are applied to recorder 23 by way of amplifier 39 and count rate meter 40, while the negative pulses from monostable multivibrator 37 are applied to the recorder 23 by way of amplifier 41 and count rate meter 42. Traces 43 and 44 represent the intensity of secondary radiation detected within the two time windows.

The oscillator system 33 employed for obtaining the desired read out pulses for systems 20 and 21 comprises a free-running multivibrator 45, a differentiate circuit 46, and diodes 47 and 48. Diode 47 passes the positive output pulses to storage system 20 while diode 48 passes the negative pulses. The latter pulses are inverted at 49 and applied to storage system 21 for read out purposes. The solid lines of FIGURE 2D represent the positive pulses from diode 47 while the dotted lines represent the pulses from diode 48. As illustrated, the pulses are spaced midway between each other. Read out from storage systems 20 and 21 is dependent upon pulses from diodes 47 and 48. Thus, pulses read out from systems 20 and 21 will not occur at the same time.

In the system of FIGURE 1, the frequency of the oscillator 33 and hence of multivibrators 36 and 37 may be of the order of five kilocycles when employing the conventional multistable conductors. The time duration of the pulses for multivibrators 36 and 37 may be of the order of 50 microseconds. Under these conditions, and since multivibrators 36 and 37 are triggered at spaced apart time intervals, application of coincident pulses by multivibrators 36 and 37 to cable conductor 22 is prevented.

In the operation of the system of FIGURE 1, wherein periodic measurements are obtained, sufficient time is provided between measurement intervals to allow read out to occur at five kilocycles of all of the pulses the units 20 and 21 are designed to store. In pulsed neutron operations, the two time windows employed generally are of the order of 100 microseconds each and may begin, respectively, at about 500 and 800 microseconds following the end of each neutron burst. During these 100 microsecond time windows, generally not more than about three thermal neutrons will be detected. Thus, the units 20 and 21 employed should be capable of storing at least three detector pulses each. Sufficient read out time for reading out the three pulses between measurement intervals will be provided if the well logging system is operated to produce sharp bursts of neutrons at a repetition rate of about 1000 cycles per second.

In the system of FIGURE 1, the pulsed neutron source 15 may be a conventional D–T source which is pulsed, by means of oscillator 50, operating at 1000 cycles per second, and a pulse generator 51. The 100 microsecond time windows are obtained by applying the output of oscillator 50 to two delay units 52 and 53 which may have a time delay, respectively, of about 500 microseconds and 800 microseconds in the event that sharp neutron bursts are employed. Delay 52 opens gate 54 to allow the detector pulses to pass to the storage unit 20 only during the first time window while delay 53 opens gate 55 to allow detector pulses to pass to the storage unit 21 only during the second time window.

Referring now to FIGURE 3, there will be described a suitable add and subtract counter for use in the storage units 20 and 21. The counter illustrated in FIGURE 3 is employed in storage unit 20. This counter comprises two bistable multivibrators 60 and 61 for storing at least three detector pulses. As indicated previously, these pulses are read out by oscillator 33 for application to the cable conductor 22 by way of monostable multivibrator 36. Gate 35, comprising monostable multivibrator 62 and AND gate 63, prevents read out in event that detector pulses are being applied to the counting system.

As illustrated, negative detector pulses are applied to multivibrator 60 by way of conductor 64, diode 65, and conductor 66. These pulses also are applied to bistable multivibrator 67 which controls AND gates 68 and 69. These gates control the application of the output of multivibrator 60 to multivibrator 61. The outputs of multivibrators 60 and 61 in turn are applied from their right stages, respectively, by way of conductors 70 and 71 to diodes 72 and 73 and AND gate 74. When detector pulses are stored in multivibrators 60 and 61, at least one of their right stages will be nonconducting for the production of a positive output. Under these conditions, AND gate 74 allows positive pulses, produced by oscillator 33, to pass to AND gate 63. In the event that no detector pulses are being applied to the system, multivibrator 62 produces a positive output which allows the oscillator pulses to pass AND gate 63 for read out. During read out, the output of AND gate 63 is applied to multivibrator 36, for transmission purposes and in addition inverted at 75, and fed back to multivibrator 67 to effect subtraction of a pulse from multivibrators 60 and 61. When a detector pulse is being applied to the system, multivibrator 62 is triggered to produce a negative pulse which blocks the passage of oscillator pulses to AND gate 63.

The sequence of operation of the system will be described now for the addition of three consecutive detector pulses and the subsequent read out of these pulses. The detector pulses are assumed to occur between oscillator pulses applied to system 20 as illustrated in FIGURES 2C and 2D. In this description, it is to be understood that the left and right stages of multivibrator 67 initially are conducting and nonconducting, respectively, while the left and right stages of multivibrators 60 and 61 initially are nonconducting and conducting. The latter condition is illustrated at the start position in the table to FIGURE 4, wherein the plus symbol indicates a nonconducting condition, while the zero symbol indicates a conducting condition. In addition, multivibrator 67 is of the type wherein negative pulses applied to the appropriate stage thereof will cause the multivibrator to flip to its other state. Multivibrators 60 and 61 may be of the transistor type wherein the inputs are applied to the base of each stage and where in a negative pulse causes the multivibrator to flip to its other state. All of the AND gates pass only positive pulses.

The first detector pulse causes the multivibrator 67 to be flipped to its other state whereby a positive and negative output is applied, respectively, by way of conductors 80 and 81 to AND gates 68 and 69. Thus, AND gate 69 is closed while AND gate 68 is open to positive pulses. The first detector pulse additionally causes multivibrator 60 to flip to its other state. A positive output is applied by way of conductors 70 and 82, from multivibrator 60, and through AND gate 68, where it is differentiated at 83. The resulting positive pulse is applied through diode 84 and inverted at 85 to flip multivibrator 61 to its other state. Thus, the right stages of both multivibrators 60 and 61 produce a positive output as indicated in FIGURE 2 at the position opposite the first detector pulse.

If no other detector pulses occur before the next pulse from oscillator 33, the pulse stored in multivibrators 60 and 61 will be read out by the oscillator pulse. Assuming however, that two more detector pulses occur before the next oscillator pulse, the sequence of operation is as follows. The second detector pulse does not affect multivibrator 67, hence the right stage will still produce a negative output which maintains AND gate 69 closed. The second detector pulse, however, will flip multivibrator 60 to its initial condition. The left stage of multivibrator 60 then produces a positive output which is applied by way of conductor 86 to AND gate 69 where it is blocked. The negative output from the right stage of multivibrator 60 cannot pass AND gate 68.

The third detector pulse causes multivibrator 60 to flip to its other state. The resulting negative output from the left stage of multivibrator 60 cannot pass AND gate 69 but the positive output will pass AND gate 68. An output thus is applied to multivibrator 60 whereby it is flipped to its initial state.

Since the right stage of multivibrator 60 now is nonconducting, read out can occur upon the presentation of oscillator pulses. More particularly, as is evident, AND gate 74 will be opened for the passage of the first oscillator pulse. As indicated previously, this pulse will be applied through AND gate 63 to cable conductor 22 by way of multivibrator 36. The output from AND gate 63 additionally is inverted at 75 and applied to multivibrator 60 and to multivibrator 67 to subtract out a pulse from multivibrators 60 and 61. The negative pulse from inverter 75 is applied to multivibrator 67 by way of conductors 90 and 91 and to multivibrator 60 by way of conductor 90, diode 92, and conductor 66. Multivibrator 67 will be flipped to its initial condition whereby negative and positive outputs will be applied, respectively, to AND gates 68 and 69. AND gates 68 thus is blocked while AND gate 69 is opened to positive pulses. The negative pulse from inverter 75 additionally causes multivibrator 60 to flip to its initial state. A positive output from the left stage of multivibrator 60 then passes through AND gate 69 and is differentiated at 93. The resulting positive pulse from circuit 93 is applied through diode 94, and inverted at 85 to flip multivibrator 61 to its other state. The condition of the two multivibrators 60 and 61 following the application of the first oscillator pulse is indicated in the table of FIGURE 4. Since the right stage of multivibrator 61 will be producing a positive output, the second oscillator pulse from oscillator 33 will be applied through AND gates 74 and 63 to multivibrator 36 and fed back into the counting system. The second oscillator pulse will not affect multivibrator 67; however, it will cause multivibrator 60 to flip to its other state. Under these conditions, multivibrator 61 will remain unaffected. Since the right stages of both multivibrators 60 and 61 will be producing a positive output, a third oscillator pulse will then be able to pass to cable 22 and back into the counter. This pulse, however, as can be understood, will cause both of multivibrators 60 and 61 to be flipped to their initial conditions. When both multivibrators 60 and 61 are in their initial conditions, the right stages thereof produce a negative output whereby gate 74 will be blocked to prevent oscillator pulses from passing to gate 63.

Now that the sequence of the operation of the system has been described for the addition and read out of three pulses, the sequence of operation of the system for the addition and read out of one or two pulses becomes evident. If it is desired to store more than three pulses in the system, additional multivibrators similar to multivibrators 60 and 61 may be employed.

Although the transmission system of the present system has been described in conjunction with a pulse neutron well logging system, it is to be understood that the system can be employed in other types of well logging systems wherein periodic measurements are obtained.

In the well logging system of FIGURE 1, cable 12 is wound and unwound upon drum 100 driven by motor 101 and connection 102 in order to move the borehole tool 10 through the borehole. In addition, the chart of recorder 23 is driven in correlation with depth by measuring reel 103 and connection 104 whereby traces 43 and 44 are recorded in correlation with depth.

Now that the invention has been described, it is to be understood that modifications will suggest themselves to those skilled in the art, and it is intended to cover such modifications as fall within the scope of the appended claims.

What is claimed is:
1. A well logging system comprising:
a borehole tool,
at least one transmission line extending from said tool to the surface,
a radiation energy detector located in said tool for producing pulses representative of radiation detected within said borehole,
storage means located at least in part in said tool for storing, within said tool, said detector pulses,
said storage means having a capacity sufficient to store more than one detector pulse,
means coupled to said storage means for generating timing pulses at a predetermined relatively low frequency for reading out, at said predetermined frequency, pulses stored in said storage means for application to said transmission line for transmission between the surface and said borehole tool, and
recording means located at the surface for obtaining a measurement representative of said pulses applied to said transmission line.
2. The system of claim 1 including:
means responsive to the output of said detector for preventing read out to occur when detector pulses are being applied to said storage means.
3. A well logging system comprising:
a borehole tool,
at least one cable conductor extending from said tool to the surface,
a source located in said tool for irradiating the formations with primary radiation for the production of secondary radiation,
a radiation energy detector located in said tool for producing pulses representative of secondary radiation detected within said borehole, storage means located in said tool and coupled to said detector for storing counts representative of said pulses, said storage means having a capacity sufficient to store more than one count, means located in said tool for generating timing pulses at a predetermined low frequency, said storage means being responsive to said timing pulses for the production of output pulses representative of counts stored therein for application to said cable conductor, said output pulses produced occurring at the same frequency as said timing pulses, and means responsive to said detector output for preventing the application of said output pulses to said cable in the event detector pulses are being applied to said storage means.

4. A well logging system comprising:

a borehole logging tool having a cable conductor extending therefrom for transmitting information between the surface and said logging tool, a source located in said tool for irradiating the formations with primary radiation for the production of secondary radiation, a radiation energy detector located in said tool for producing pulses representative of the secondary radiation detected within said borehole, storage means located at least in part in said tool for storing, within said tool, pulses from said detector, said storage means having a capacity sufficient to store more than one detector pulse, means for generating timing pulses at a predetermined relatively low frequency, said storage means being responsive to said timing function for producing output pulses for application to said cable condcutor corresponding in number to the number of counts stored in said storage means and at the frequency of said timing pulses, means responsive to said detector output for preventing the application of said output pulses to said cable in the event detector pulses are being applied to said storage means, and recording means located at the surface for recording said output pulses applied to said cable conductor.

5. A radioactive well logging system comprising:

a borehole logging tool, at least one transmission line extending from said tool to the surface, a pulsed neutron source for irradiating the formations with bursts of fast neutrons spaced in time, thereby defining successive cycles of operation, a detector located in said tool for detecting secondary radiation in said borehole and for producing pulses representative of secondary radiation detected, storage means located in said tool for storing, within said tool, pulses produced by said detector, pulse generating means coupled to said storage means for generating timing pulses at a predetermined relatively low frequency for reading out, at said predetermined frequency, pulses stored in said storage means for application to said transmission line for transmission from said borehole tool to the surface, and recording means located at the surface for obtaining a measurement representative of said pulses applied to said transmission line.

6. The system of claim 5 comprising:

gate means located in said tool for passing to said storage means only detector pulses representative of radiation detected within a predetermined time period within each cycle of operation.

7. The system of claim 6 including:

means responsive to the output of said detector for preventing read out to occur when detector pulses are being applied to said storage means.

8. The system of claim 7 including:

means responsive to pulses from said storage means for generating pulses of increased width for application to said transmission line.

9. The system of claim 5 wherein:

said storage means comprises first and second storage means for storing detector pulses applied thereto, gate means located in said tool for passing to said first and second storage means only said detector pulses produced during first and second time periods, respectively, occurring during each cycle of operation, said pulse generating means being coupled to said first and second storage means for generating timing pulses at a predetermined relatively low frequency for reading out, at said predetermined frequency, pulses stored in said first and second storage means for application to said transmission line for transmission from said borehole tool to the surface.

10. The system of claim 9 wherein:

said first and second storage means each have a capacity sufficient to store more than one detector pulse.

11. The system of claim 10 including:

means responsive to the output of said detector for preventing read out to occur from said first and second storage means when detector pulses are being applied to said first and second storage means.

12. The system of claim 10 wherein:

said pulse generating means produces alternately first and second spaced-apart timing pulses, said first timing pulses being produced at said predetermined frequency, said second timing pulses being produced at said predetermined frequency, said first and second timing pulses being applied to said first and second storage means, respectively, for reading out, at said predetermined frequency, pulses stored in said first and second storage means for application to said transmission line for transmission from said borehole tool to the surface.

13. The system of claim 12 including:

means for converting said pulses from said first and second storage means to pulses of first and opposite polarity for application to said transmission line.

14. The system of claim 12 including:

means for increasing the width of said pulses from said first and second storage means before application to said transmission line, said pulses produced during each of said first and second time periods in a given cycle of operation being stored, read out, increased in width, and applied to said transmission line before the occurrence of said first and second time periods in a succeeding cycle of operation.

15. The system of claim 13 wherein said last-named means comprises:

means responsive to pulses from said first storage means for generating pulses of a first polarity for application to said transmission line, and means responsive to pulses from said second storage means for generating pulses of an opposite polarity for application to said transmission line, said pulses of said first and opposite polarity being generated at an increased width.

16. The system of claim 15 including:

means responsive to the output of said detector for preventing read out from said first and second storage means to occur when detector pulses are being applied to said first and second storage means.

(References on following page)

References Cited

UNITED STATES PATENTS

| | | | |
|---|---|---|---|
| 2,802,951 | 8/1957 | Seerers | 250—71.5 |
| 2,856,537 | 10/1958 | Clark | 250—71.5 |
| 2,883,548 | 4/1959 | Baker et al. | 250—83.3 X |
| 2,998,521 | 8/1961 | Rankin | 250—83.3 X |
| 3,050,151 | 8/1962 | Vogel | 181—.5 |
| 3,309,521 | 3/1967 | Bargainer | 250—83.3 |
| 3,337,746 | 8/1967 | Georgi et al. | 340—18 X |

RALPH G. NILSON, *Primary Examiner.*

SAUL ELBAUM, *Assistant Examiner.*

U.S. Cl. X.R.

181—.5; 250—71.5; 340—18